United States Patent
Ridgley (10) Patent No.: US 6,195,418 B1
(45) Date of Patent: Feb. 27, 2001

(54) TELEPHONE SYSTEM HAVING A CALLBACK CAPABILITY AND METHOD FOR CONNECTING A RECIPIENT OF A MESSAGE TO A CALLER

(75) Inventor: Jay W. Ridgley, Round Rock, TX (US)

(73) Assignee: Alcatel USA, Inc., Plano, TX (US)

( * ) Notice: Under 35 U.S.C. 154(b), the term of this patent shall be extended for 0 days.

(21) Appl. No.: 09/001,707

(22) Filed: Dec. 31, 1997

(51) Int. Cl.⁷ .................................................. H04M 1/64
(52) U.S. Cl. ................................. 379/88.23; 379/88.19
(58) Field of Search .................................... 379/210, 211, 379/212, 213, 214, 88.22–88.26, 88.19, 88.2, 88.21, 142, 201, 111, 114

(56) References Cited

U.S. PATENT DOCUMENTS

| | | | |
|---|---|---|---|
| 4,549,047 | 10/1985 | Brian et al. ............................ | 179/18 |
| 4,847,890 | * 7/1989 | Solomon et al. ..................... | 379/211 |
| 4,961,216 | 10/1990 | Baehr et al. ............................ | 379/57 |
| 4,972,461 | 11/1990 | Brown et al. ......................... | 379/67 |
| 5,283,818 | 2/1994 | Klausner et al. ...................... | 379/67 |
| 5,425,091 | 6/1995 | Josephs ................................. | 379/201 |
| 5,455,852 | 10/1995 | Elrod et al. ............................ | 379/67 |
| 5,497,413 | 3/1996 | Nakano ................................. | 379/89 |
| 5,568,539 | 10/1996 | Bergsman et al. .................... | 379/67 |
| 5,625,682 | 4/1997 | Gray et al. ............................ | 379/266 |
| 5,646,982 | 7/1997 | Hogan et al. .......................... | 379/89 |
| 5,657,376 | 8/1997 | Espeut et al. ......................... | 379/89 |
| 5,671,269 | 9/1997 | Egan et al. ............................ | 379/88 |
| 5,740,229 | * 4/1998 | Hanson et al. ....................... | 379/112 |
| 5,742,674 | * 4/1998 | Jain et al. ......................... | 379/201 X |
| 5,768,359 | * 6/1998 | DiPierro, Jr. et al. ........... | 379/142 X |
| 5,784,438 | * 7/1998 | Martinez ......................... | 379/210 X |
| 5,832,060 | * 11/1998 | Cortlett et al. ................... | 379/210 X |
| 5,835,568 | * 10/1998 | Bass et al. .................... | 379/88.25 X |

* cited by examiner

Primary Examiner—Scott L. Weaver
(74) Attorney, Agent, or Firm—Kenyon & Kenyon (57) ABSTRACT

After playing a message, a message delivery system prompts a message recipient with an option to automatically call back the calling party. If the recipient activates the callback feature, the message delivery system retrieves the calling party's telephone number and directs the telecommunications switch to connect the return telephone call from the called unit to the calling unit. If the return telephone call is answered by the calling unit, the message delivery system may optionally direct the billing system to charge the telephone number corresponding to the calling unit for the return telephone call initiated by the recipient. Additionally, the message delivery system may optionally include a feature whereby the calling party expressly provides the system with a telephone number to which a call is to be returned, i.e., a telephone number other than the one associated with the calling unit from which the calling party placed the call.

28 Claims, 8 Drawing Sheets

TELEPHONE SYSTEM HAVING A CALLBACK CAPABILITY AND METHOD FOR CONNECTING A RECIPIENT OF A MESSAGE TO A CALLER

FIELD OF THE INVENTION

The present invention relates to a telephone system and method for allowing a recipient of a telephone message to be connected to a caller that originated the telephone message.

BACKGROUND INFORMATION

Telephone message systems and voice mail systems have become widely used. In fact, these systems are now essential for most industries and are extensively utilized. Such systems allow a calling party to record a voice message or a numeric message for a recipient when the calling party does not reach the recipient (e.g., when the recipient is not available to answer the call, when the recipient is connected to another calling party, etc.). These systems may be incorporated in the general telephone system, and may route telephone calls from the calling parties to the respective recipients. Additionally, the telephone message systems (or the voice mail systems) may be incorporated in a Private Branch Exchange (PBX) of the recipient.

Generally, to record a voice message when the calling party cannot be connected to the recipient, the calling party is first connected to the telephone message system (or the voice mail system). The calling party is then prompted to speak a message. In response thereto, the calling party provides a voice message through a telephone microphone. The voice message is then stored in a storage arrangement (e.g., a storage unit, memory, etc.) of the message system. Finally, the connection between the calling party and the system is severed. The recipient can retrieve the stored message from the telephone message system. Thereafter, the recipient contacts the calling party by dialing the calling party's telephone number. However, if the calling party did not provide a telephone number in the voice message, the recipient may have no way of knowing how to contact the calling party.

Some telephone message systems allow the calling party to provide a numeric message to the recipient if the recipient is not available. For example, when the calling party is connected to the telephone message system, the calling party may indicate the originating telephone number using a touchtone key pad of the calling party's telephone. The telephone message system then translates this telephone number into system voice generated numbers. These system voice generated numbers can then be stored in the telephone message system. The recipient can then retrieve these numbers and contact the calling party.

Other developments in the known voice mail systems enable the calling party's telephone number to be extracted from the data transmitted by the telephone system in connection with the call. For example, U.S. Pat. No. 5,671,269 describes a telephone communication apparatus that includes equipment which detects a calling party's telephone number (i.e., the calling number). The calling number is then stored in a data storage unit, along with a recorded message from the calling party. The recipient of the message retrieves the message and the stored calling number.

However, none of the known systems and methods allows the recipient of a telephone message to automatically return the call by pressing a predetermined key sequence. Furthermore, known systems and methods do not address billing the calling party for the returned telephone call that is initiated by the recipient of the message (i.e., with a predetermined key sequence).

SUMMARY OF THE INVENTION

In accordance with an exemplary embodiment of the present invention, a calling party initiates a telephone call from the calling unit. The telephone call is coupled to a called unit.

In the exemplary embodiment, if the telephone call is not answered at the called unit, a message delivery system prompts the calling party at the calling unit to leave a voice message for the called party.

In response to the prompt, the calling party provides a voice message to the message delivery system. The calling party's telephone number and the voice message associated with the calling party's telephone number is stored in a storage device.

In accordance with the exemplary embodiment of the present invention, when a message recipient (i.e., the called party) desires to retrieve messages from the message delivery system, the message recipient activates the called unit to call a telephone number associated with the message delivery system. The message delivery system answers the call and prompts the message recipient for input. The message recipient may then activate a callback feature by, for example, pressing a first predetermined sequence of digits (e.g., "1" "1" "3", etc.) on the touch-tone keypad of the called unit.

After the callback feature is activated, the message delivery system identifies that the called unit is requesting the voice message assigned to the called unit. At the same time, an information decoder receives and decodes the telephone number of the called unit, which may then be stored in the storage device by the processor. The processor then retrieves the voice message originated by calling unit, and replays the voice message to the message recipient, e.g., using a voice response unit.

After playing the message, the message delivery system prompts the message recipient with an option to automatically call back the calling party by pressing a second predetermined key sequence (e.g., "*"). If the recipient presses this second predetermined key sequence, the message delivery system retrieves the calling party's telephone number (associated with the voice message) and directs the telecommunications switch to connect the return telephone call from the called unit to the calling unit.

If the return telephone call is answered by the calling unit, the message delivery system may optionally direct the billing system to charge the telephone number corresponding to the calling unit for the return telephone call initiated by the recipient.

Additionally, the message delivery system may optionally include a feature whereby the calling party expressly provides the system with a telephone number to which a call is to be returned, i.e., a telephone number other than the one associated with the calling unit from which the calling party placed the call.

DETAILED DESCRIPTION

Overall System Architecture

Figure 1:
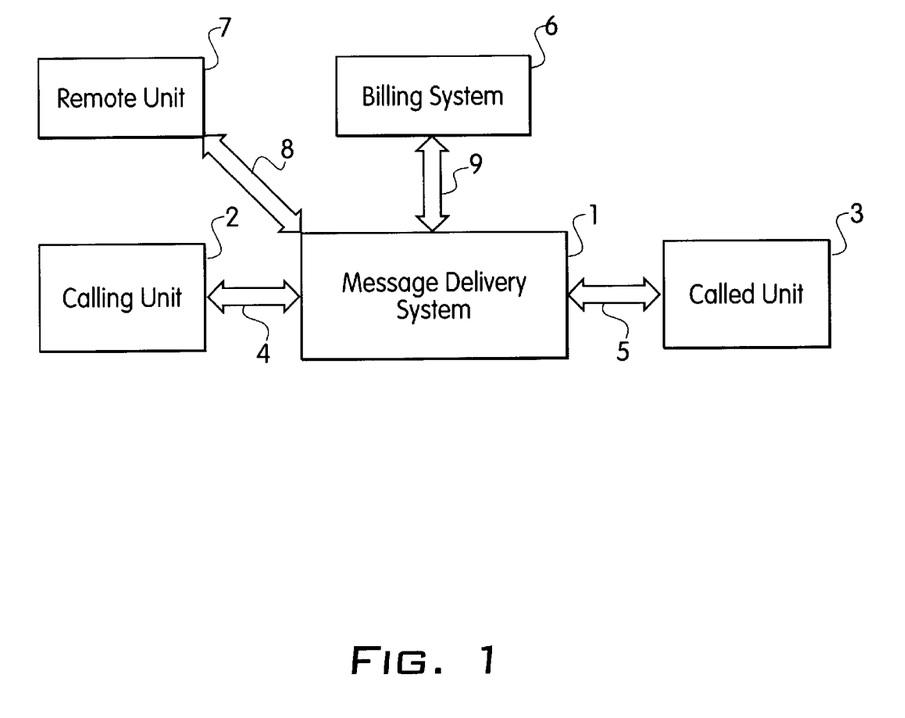
FIG. 1 illustrates the overall system architecture of an exemplary embodiment of the present invention.

Referring initially to FIG. 1, the overall system architecture of an exemplary embodiment of the present invention is provided. A calling unit 2, a called unit 3, and a remote unit 7 are coupled to a message delivery system 1. Each of the calling unit 2, called unit 3, and remote unit 7 may include, for example, an analog or digital telephonic device, and may be coupled to the message delivery system by a respective communication arrangement, i.e., communication arrangements 4, 5, and 8, respectively. The communication arrangements 4, 5, and 8 may include, for example, a public telephone switching network, a private branch exchange, a digital telephone network, a fiber-optic communications network, a cellular telephone network, etc.

Additionally, in the exemplary embodiment of the present invention, a billing system 6 is coupled to the message delivery system 1. The billing system 6 may be positioned locally or may be positioned at a remote location relative to the message delivery system 1. In the exemplary embodiment, the billing system 6 is executed in a system separate from the message delivery system 1. Alternatively, however, the billing system may be incorporated into the message delivery system 1.

The message delivery system 1 is generally connected to other telephone networks (not shown).

Message Delivery System

Figure 2:
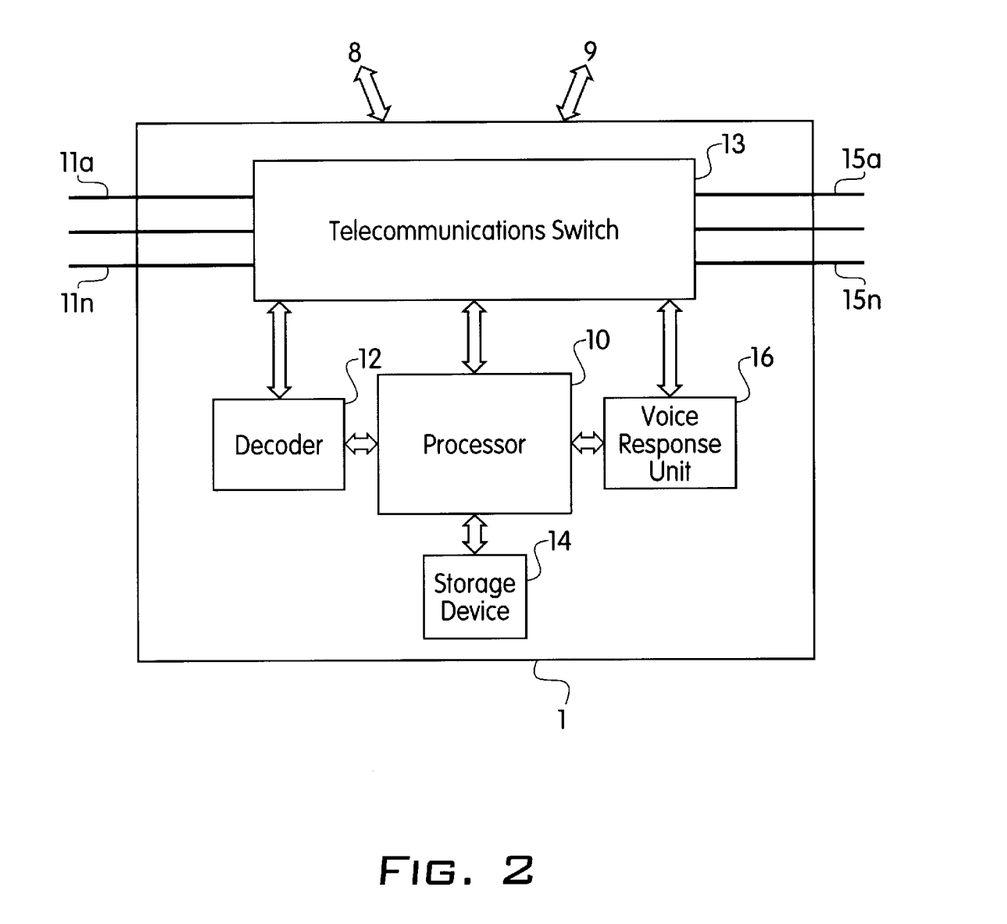
FIG. 2 illustrates an exemplary message delivery system illustrated in FIG. 1.

FIG. 2 illustrates the exemplary message delivery system 1 in further detail. In accordance with the present invention, the exemplary message delivery system 1 may include, for example, a telecommunications switch 13. The telecommunication switch 13 may be coupled to a number of first telephone lines 11a–11n and to a number of second telephone lines 15a–15n. Each of the first telephone lines 11a–11n and the second telephone lines 15a–15n may be coupled to a local telephone unit (not shown), and/or to a private or public telephone network (including, for example, analog, digital, and cellular systems) (not shown).

In the exemplary embodiment, the telecommunications switch 13 is controlled by a processor 10 coupled thereto. The processor 10, which may include, for example, a high performance microprocessor, a minicomputer, a mainframe computer, or even a network of processors (which are commercially available), is coupled to a storage device 14.

The message delivery system 1 may further include an information decoder 12 and a voice response unit 16 (which are also commercially available), each coupled to the telecommunications switch 13 and the processor 10.

In accordance with the present invention, the processor 10 controls the telecommunications switch 13 (which is commercially available) to selectively couple any of the first telephone lines 11a–11n to any of the second telephone lines 15a–15n, to the information decoder 12, and/or to the voice response unit 16.

Overview Of Operation

In operation, a calling party initiates a telephone call from the calling unit 2. The telephone call is transmitted via the communications arrangement 4 to a selected first telephone line 11a–11n of the message delivery system 1. The processor 10 controls the telecommunications switch 13 to couple the information decoder 12 to the selected incoming telephone line. The information decoder 12 decodes signals associated with the call. Such signals may include, for example, an automatic number identification (ANI) signal which provides the calling party's telephone number. The decoded information, in this case, the telephone number corresponding to the calling unit 2, is then provided to the processor 10, and is stored in the storage device 14.

The telecommunications switch 13 also receives a requested destination telephone number (i.e., a called number) which corresponds to the telephone number of the called unit 3. This called number may be provided via the telecommunications switch 13 (either directly, or indirectly through the information decoder 12) to the processor 10. The processor 10 determines whether the called number is a valid telephone number, and if so controls the telecommunications switch 13 to couple the telephone call (either directly via an second telephone line 15a–15n, or indirectly through a network coupled to an second telephone line 15a–15n) to communications arrangement 5, and, more specifically, to called unit 3. The called number is also associated with the telephone number corresponding to the calling unit 2 and stored in the storage device 14.

In the exemplary embodiment, if the telephone call is not answered at the called unit 3 (e.g., the processor 10 identifies via, for example, a ring detector—not shown, that the called unit 3 was not activated after a predetermined number of rings) or if the called unit 3 is already activated (e.g., there is a busy signal), the message delivery system 1 prompts the calling party at the calling unit 2 (e.g., using processor 10 and voice response unit 16) to leave a voice message for the called party.

In response to the prompt, the calling party provides a voice message to the message delivery system 1 (e.g., via a microphone of the calling unit 2 and/or a touch-tone telephone keypad). The voice message is stored by the processor 10 in the storage device 14 using the called number and the telephone number corresponding to the calling unit 2 as index identifiers. The message delivery system 1 (using the processor 10) may then provide a message signal to the called unit 3 indicating to the recipient (i.e., the called party) that the voice message was stored in the message delivery system 1 for that intended recipient. For example, the message delivery system 1 may turn on a light at the called unit 3, provide an audio indication to the called unit 3 (e.g., a series of beeping sounds) to be heard by the called party when the called unit 3 is activated, or may periodically place a call to called unit 3 to provide audio instructions (e.g., vocal instructions) to the called party via voice response unit 16.

In accordance with the exemplary embodiment of the present invention, when the recipient (i.e., the called party) desires to retrieve messages from the message delivery system 1, the message recipient activates the called unit 3 to call a telephone number associated with the message delivery system 1. The message delivery system 1 answers the call (via processor 10) and prompts the message recipient (via voice response unit 16) for input. The recipient may then press a first predetermined sequence of digits (e.g., "1" "1" "3", etc.) on the touch-tone keypad of the called unit 3. The recipient (i.e., the called party) may activate the callback feature using, for example, voice commands.

After the predetermined key sequence is depressed, the message delivery system 1 (using the processor 10) identifies that the called unit 3 is requesting the voice message assigned to the called unit 3 (using the called number as an index identifier). At the same time, the information decoder 12 receives and decodes the telephone number of the called unit 3, which may then be stored in the storage device 14 by the processor 10 (using the telephone number corresponding to the calling unit 2 as an index identifier). The processor 10 then retrieves the voice message originated by calling unit 2, and replays the voice message to the recipient (i.e., the called party), for example, using the voice response unit 16.

After playing the message, the message delivery system 1 prompts (using the processor 10 and the voice response unit 16) the message recipient with an option to automatically call back the calling party by pressing a second predetermined key sequence (e.g., "*"). If the recipient presses this second predetermined key sequence, the message delivery system 1 routes the telephone call from the called unit 3 of the recipient to the calling unit 2 of the calling party. In particular, when the second predetermined key sequence is depressed (or a predetermined voice command is entered), the processor 10 retrieves the calling party's telephone number (i.e., the telephone number of the calling party which generated the voice message for the recipient) which corresponds to the stored voice message and directs the telecommunications switch 13 to connect the return telephone call from the called unit 3 to the calling unit 2 (through, for example, the communication arrangements 4 and 5). The message delivery system 1 according to the present invention may also allow the message recipient to actuate the second predetermined key sequence without actuating the first predetermined key sequence. In other words, the message delivery system 1 may connect the returned telephone call from the called unit 3 to the calling unit 2 without the message recipient playing the message.

If the return telephone call is answered by the calling unit 2, the message delivery system 1 may optionally direct the billing system 6 to charge the telephone number corresponding to the calling unit 2 for the return telephone call initiated by the recipient.

Leaving A Message

Figure 3A:
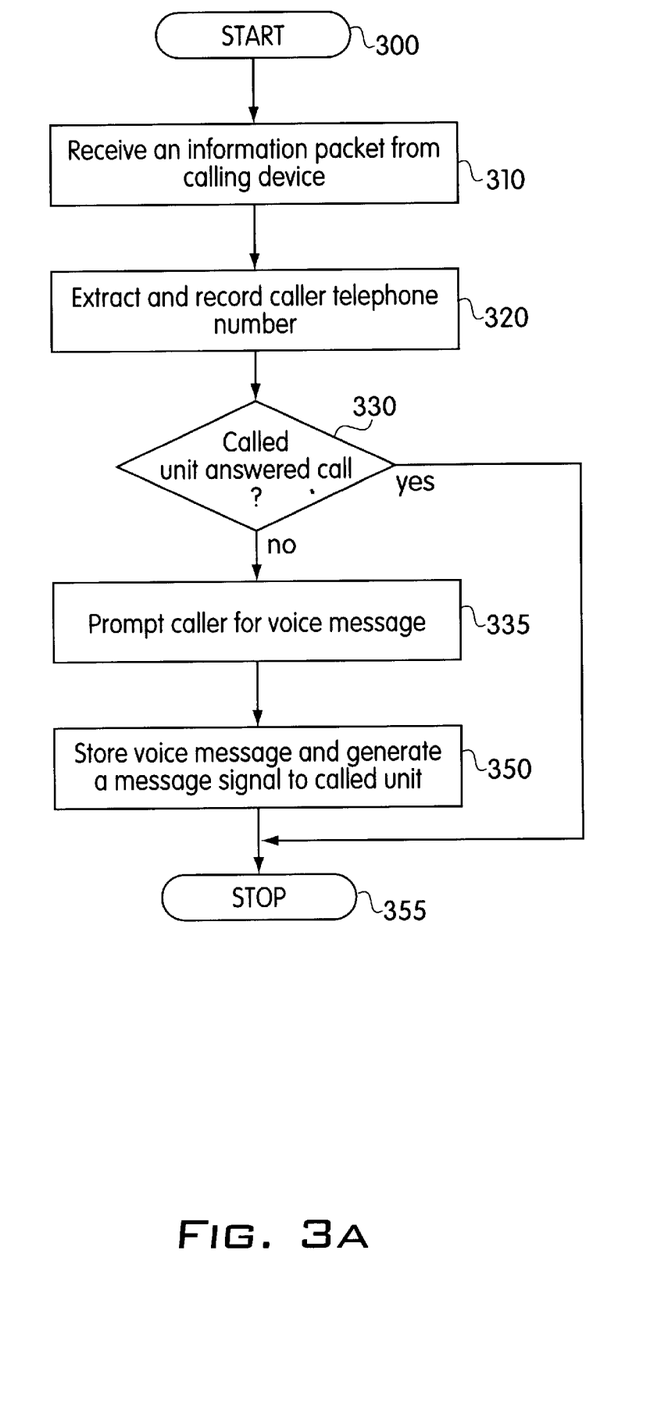
FIG. 3a shows a flowchart of an exemplary process performed by the message delivery system illustrated in FIG. 2 in connection with a calling party.

FIG. 3a shows an exemplary flowchart of a first embodiment of the callback process performed by the message delivery system 1 (e.g., by the processor 10) in connection with a calling party. According to the first embodiment, the process is initiated by the processor 10 of the message delivery system 1 (step 300) when the calling party at the calling unit 2 attempts to connect to the called unit 3. The processor 10 receives an information packet (or signals) associated with the calling unit 2 via the telecommunications switch 13 (step 310). The caller's telephone number is extracted (decoded) by the information decoder 12 and recorded in the storage device 14 (step 320).

The processor 10 next determines whether the called unit 3 was actuated (i.e., answered) in response to the telephone call from the calling unit 2 (step 330). If so, then the process according to the present invention terminates (step 355).

If the called unit 3 did not answer the telephone call (step 330), the calling party is prompted for a voice message via voice response unit 16 (step 335). In response thereto, the calling party provides a voice (or audio) message which is recorded in the storage device 14 (step 350). In addition, a message waiting signal is transmitted to the called unit 3 to notify the recipient that a voice message has been recorded for that particular recipient (step 350). The process then terminates (step 355).

Message Retrieval/Callback Feature

Figure 3B:
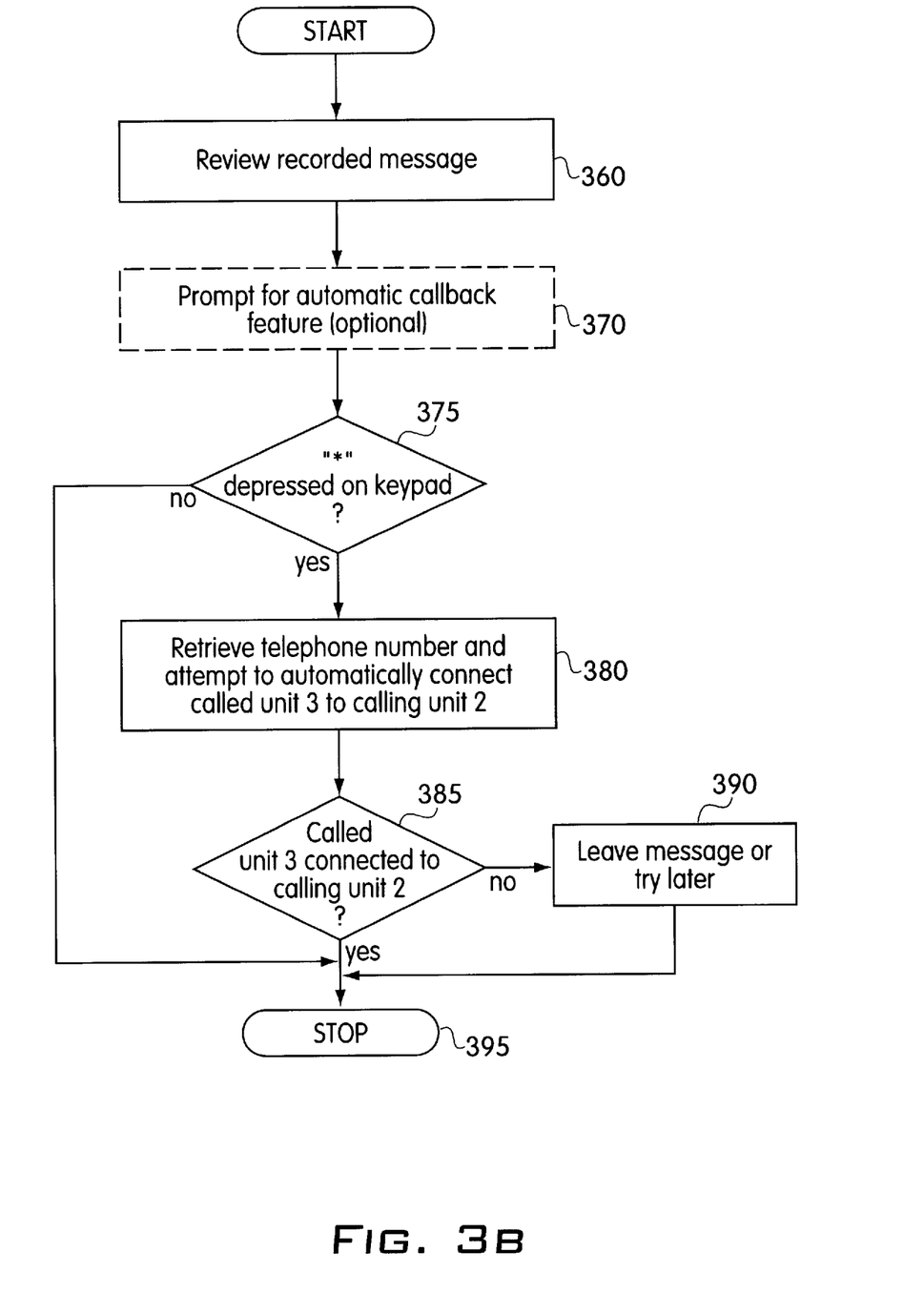
FIG. 3b shows a flowchart of an exemplary process performed by the message delivery system illustrated in FIG. 2 when a message recipient selects the message playback option in a system including a callback feature.

To retrieve messages, the message recipient accesses the message delivery system 1. For example, the message recipient (i.e., the called party) may dial a telephone number associated with the message delivery system 1, and may be connected to the message delivery system 1 via communications arrangement 5. Upon answering the call, the message delivery system 1 may prompt the message recipient for a mailbox number, a password, etc. The message recipient may then be prompted with a series of menu options, including, for example, an option to playback (or review) messages.

Once the message recipient selects the message playback (or review) option, the process illustrated in the flowchart of FIG. 3b is performed by processor 10, for example. In accordance with the exemplary embodiment, the processor 10 may play the recorded message to the message recipient (step 360). After the message is played, the message recipient is optionally prompted to depress a predetermined sequence of touch-tone keys (e.g., "*") on the touch-tone keypad of the called unit 3 if the message recipient desires to automatically return the call (step 370). If the caller does not depress the predetermined sequence within a preset time interval, the process terminates (step 395).

In an alternative embodiment, the processor 10 may also provide the calling number of the calling unit 2 which originated the message, and then inquire if the recipient prefers to play the message originated by the calling unit 2 or activate the callback feature (without listening to the message).

If the message recipient depresses the predetermined key sequence (whether in response to a prompt or not) (step 375), the message delivery system 1 retrieves the telephone number of the calling unit 2 from storage device 14, and attempts to connect the message recipient to the calling unit 2 (step 380) via communications arrangement 4. If the message delivery system 1 successfully connects the called unit 3 to the calling unit 2 (step 385), the process terminates (step 395).

If the message delivery system 1 was unsuccessful in connecting the called unit 3 to the calling unit 2, the message recipient at the called unit 3 may be prompted to leave a message (as in, for example, the process of FIG. 3a), or may be asked to try again later (step 390). The process of FIG. 3b then terminates (step 395).

Reverse Billing Feature

In accordance with a second embodiment of the present invention, a calling party leaving a message may optionally activate a return callback feature wherein the calling party is billed for the return telephone call rather than the message recipient, i.e., an automatic reverse billing feature.

Figure 4A:
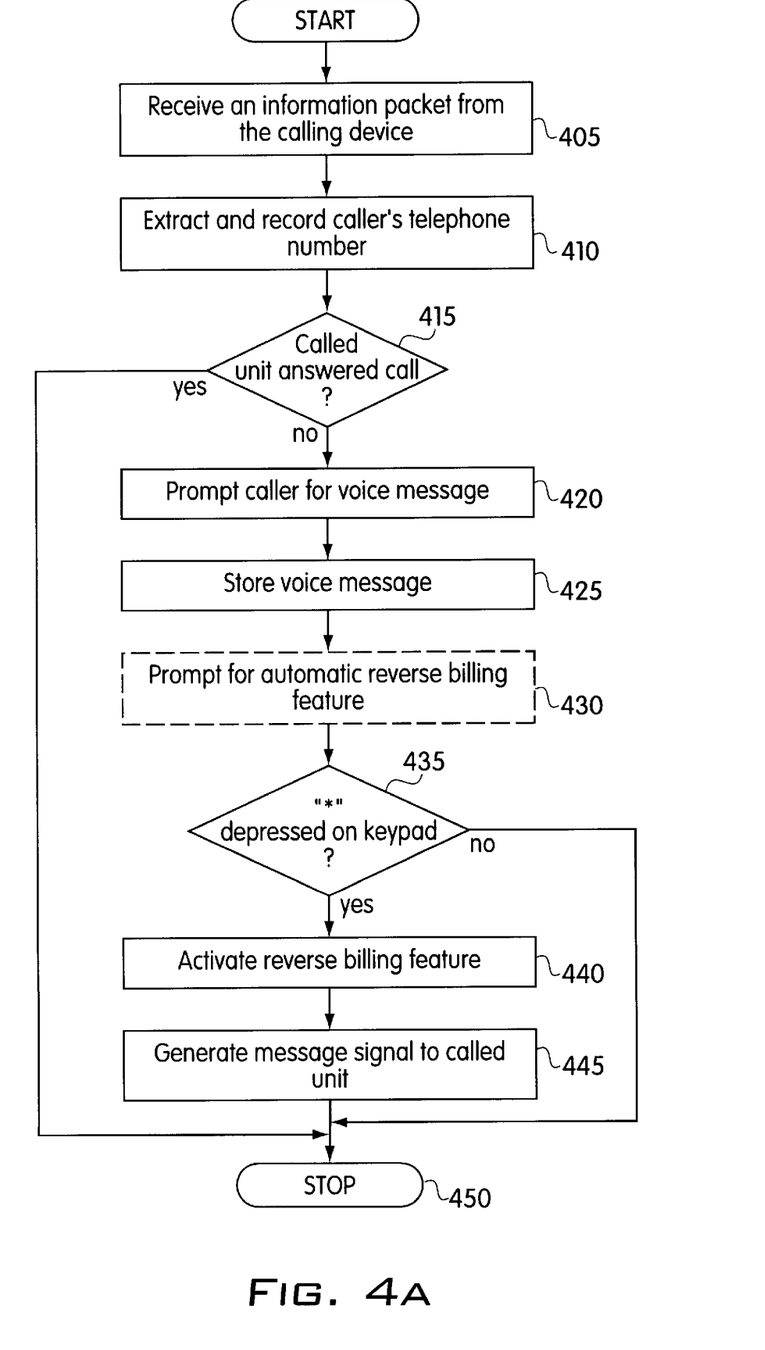
FIG. 4a shows a flowchart of an exemplary process for activating a reverse billing feature in accordance with an exemplary embodiment of the present invention.

Referring now to the flowchart of FIG. 4a, the processor 10 receives an information packet (or signals) associated with the calling unit 2 via the telecommunications switch 13 (step 405). The caller's telephone number is extracted (decoded) by the information decoder 12 and recorded in the storage device 14 (step 410). The processor 10 next determines whether the called unit 3 was actuated (i.e., answered) in response to the telephone call from the calling unit 2 (step 415). If so, the process according to the present invention terminates (step 450).

If the called unit 3 did not answer the telephone call (step 415), the calling party is prompted for a voice message via voice response unit 16 (step 420). In response thereto, the calling party provides a voice message which is recorded in the storage device 14 (step 425).

The calling party is then optionally prompted to enter a touch-tone key sequence ("*") if the calling party desires to actuate the reverse billing feature (step 430). If the calling party does not enter the sequence within a preset time, the process terminates (step 450).

If the calling party enters the appropriate touch-tone key sequence (whether prompted to or not), the reverse billing feature is activated with respect to the current voice message (step 440). That is, a bit is set and stored in association with the stored voice message and the telephone number of the calling unit 2, indicating that the calling party should be billed when the message recipient returns the call via the automatic callback feature.

A message waiting signal is then provided to the called unit 3 to notify the recipient that the voice message has been recorded for that particular recipient (step 445). The process then terminates (step 450).

Callback Feature/Reverse Billing

Figure 4B:
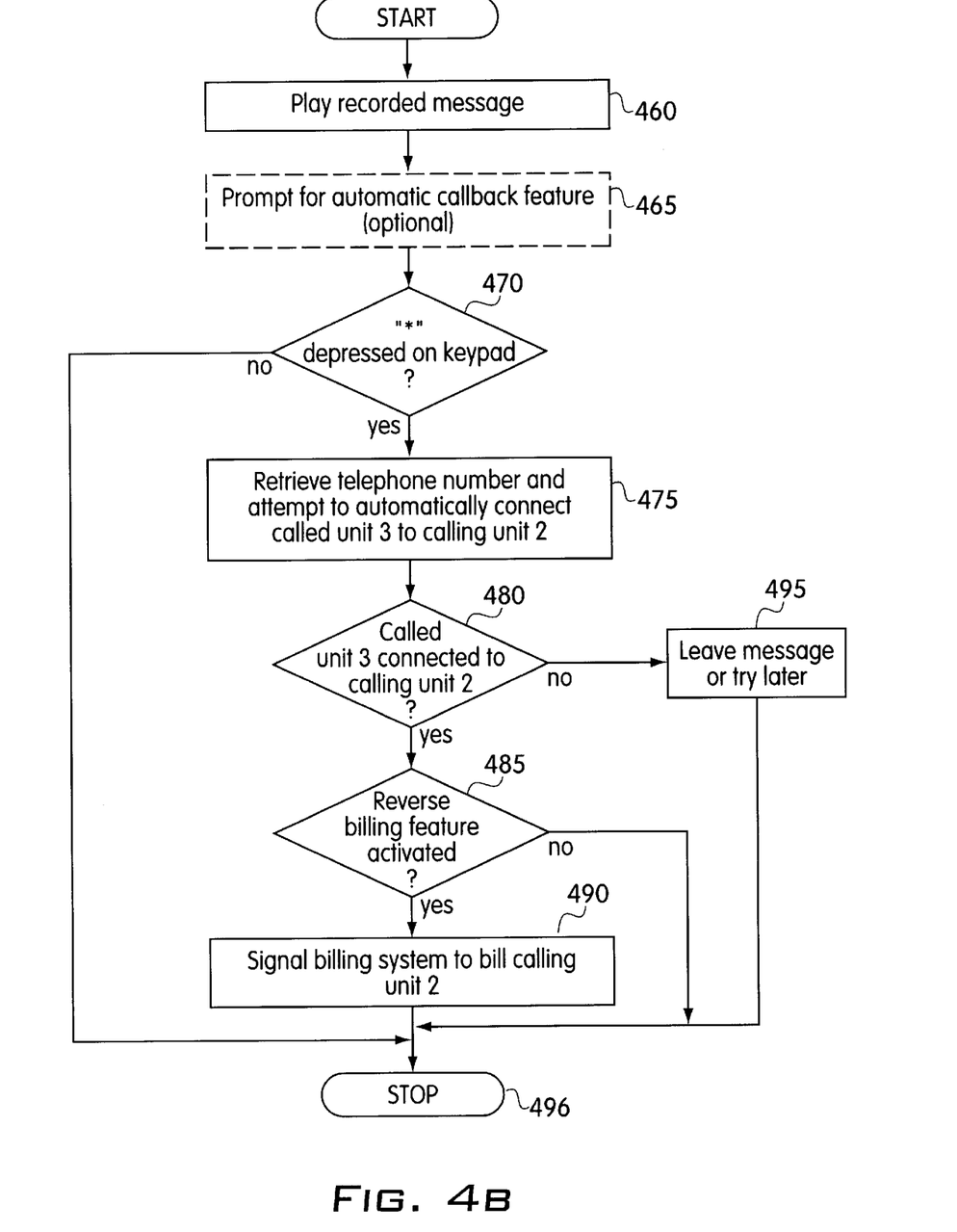
FIG. 4b illustrates a process performed in an exemplary embodiment of the present invention including the reverse billing feature.

The flowchart of FIG. 4*b* illustrates an exemplary process performed when a message recipient requests message playback, and the system supports both an automatic callback feature, and a reverse billing feature.

As described in connection with FIG. 3*b*, to retrieve messages, the message recipient accesses the message delivery system 1. For example, the message recipient may dial a telephone number associated with the message delivery system 1, and may be connected to the message delivery system 1 via communications arrangement 5. Upon answering the call, the message delivery system 1 may prompt the message recipient for a message mailbox number, a password, etc. The message recipient may then be prompted with a series of menu options, including, for example, an option to playback messages.

Once the message recipient selects the message playback option, the process illustrated in the flowchart of FIG. 4*b* is performed by, for example, processor 10. In accordance with the exemplary embodiment, the processor 10 may play the recorded message to the message recipient (step 460). After the message is played, the message recipient is optionally prompted to depress a predetermined sequence of touch-tone keys (e.g., "*") on the touch-tone keypad of the called unit 3 if the message recipient desires to automatically return the call (step 465). If the caller does not depress the predetermined sequence within a preset time interval (step 470), the process terminates (step 496).

As described above, the processor 10 may also provide the calling number of the calling unit 2 which originated the message, and then inquire if the recipient prefers to play the message originated by the calling unit 2 or activate the callback feature (without listening to the message).

If the message recipient depresses the predetermined key sequence (whether in response to a prompt or not) (step 470), the message delivery system 1 retrieves the telephone number of the calling unit 2 from storage device 14, and attempts to connect the message recipient to the calling unit 2 (step 475) via communications arrangement 4.

If the message delivery system 1 successfully connects the called unit 3 to the calling unit 2 (step 480), processor 10 determines whether or not the reverse billing feature was activated with respect to the current message (step 485). In particular, the processor 10 checks the state of the bit stored in connection with the current message. If the bit is set, the reverse billing feature was activated. If the bit was not set, the reverse billing feature was not activated.

If the reverse billing feature was activated (step 485), the message delivery system 1 signals the billing system 6 to bill the telephone number associated with the calling unit 2 rather than the called unit 3 (step 490). (In the exemplary embodiment, the billing system 6 defaults to billing the telephone number associated with the called unit 3 if it does not receive a signal from the message delivery system 1 to the contrary.) If the message delivery system 1 was unsuccessful in connecting the called unit 3 to the calling unit 2, the message recipient at the called unit 3 may be prompted to leave a message (as in, for example, the process of FIG. 4*a*), or may be asked to try again later (step 495). The process of FIG. 4*b* then terminates (step 496).

Return Telephone Number Option

Figure 5A:
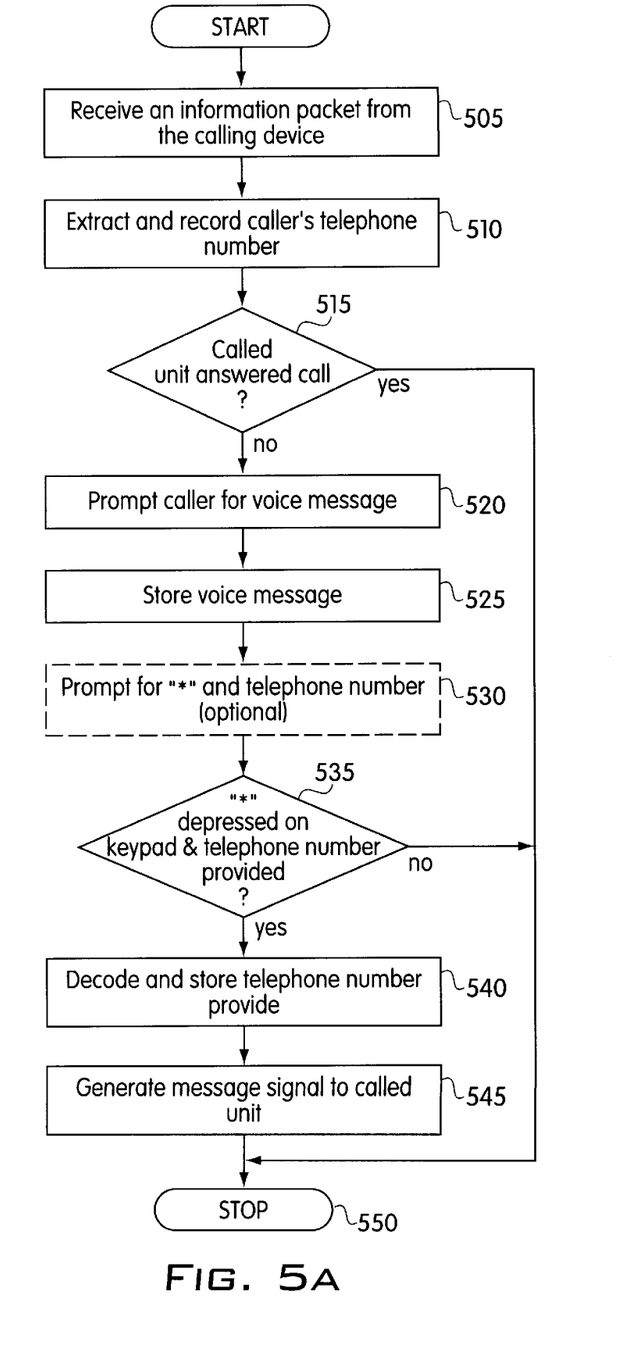
FIG. 5a illustrates an exemplary process performed when the system includes a provision for a return call to a telephone number other than the telephone number of the calling unit, in accordance with a representative embodiment of the present invention.

The flowchart of FIG. 5*a* illustrates an exemplary process performed when the system includes a provision for a return call to a telephone number other than the telephone number of the calling unit 2 from which the message was recorded (for example, the telephone number associated with the remote unit 7).

Referring now to the flowchart of FIG. 5*a*, the processor 10 receives an information packet (or signals) associated with the calling unit 2 via the telecommunications switch 13 (step 505). The caller's telephone number is extracted (decoded) by the information decoder 12 and recorded in the storage device 14 (step 510).

The processor 10 next determines whether the called unit 3 was actuated (i.e., answered) in response to the telephone call from the calling unit 2 (step 515). If so, then the process according to the present invention terminates(step 550).

If the called unit 3 did not answer the telephone call (step 520), the calling party is prompted for a voice message via voice response unit 16 (step 520). In response thereto, the calling party provides a voice message which is recorded in the storage device 14 (step 525).

The calling party is then optionally prompted to enter a touch-tone key sequence ("*") and either speak or touch-tone the telephone number of the unit at which the calling party desires to receive a return telephone call(step 535). If the calling party does not enter the sequence, and/or does not speak or touch-tone a telephone number within a preset time, the process terminates (step 550)

If the calling party enters the appropriate touch-tone key sequence (whether prompted to or not), the spoken or touchtone telephone number is decoded and stored in association with the telephone message (step 540).

A message waiting signal is then provided to the called unit 3 to notify the recipient that the voice message has been recorded for that particular recipient (step 545). The process then terminates (step 550).

Callback Feature/Return Telephone Number Feature

Figure 5B:
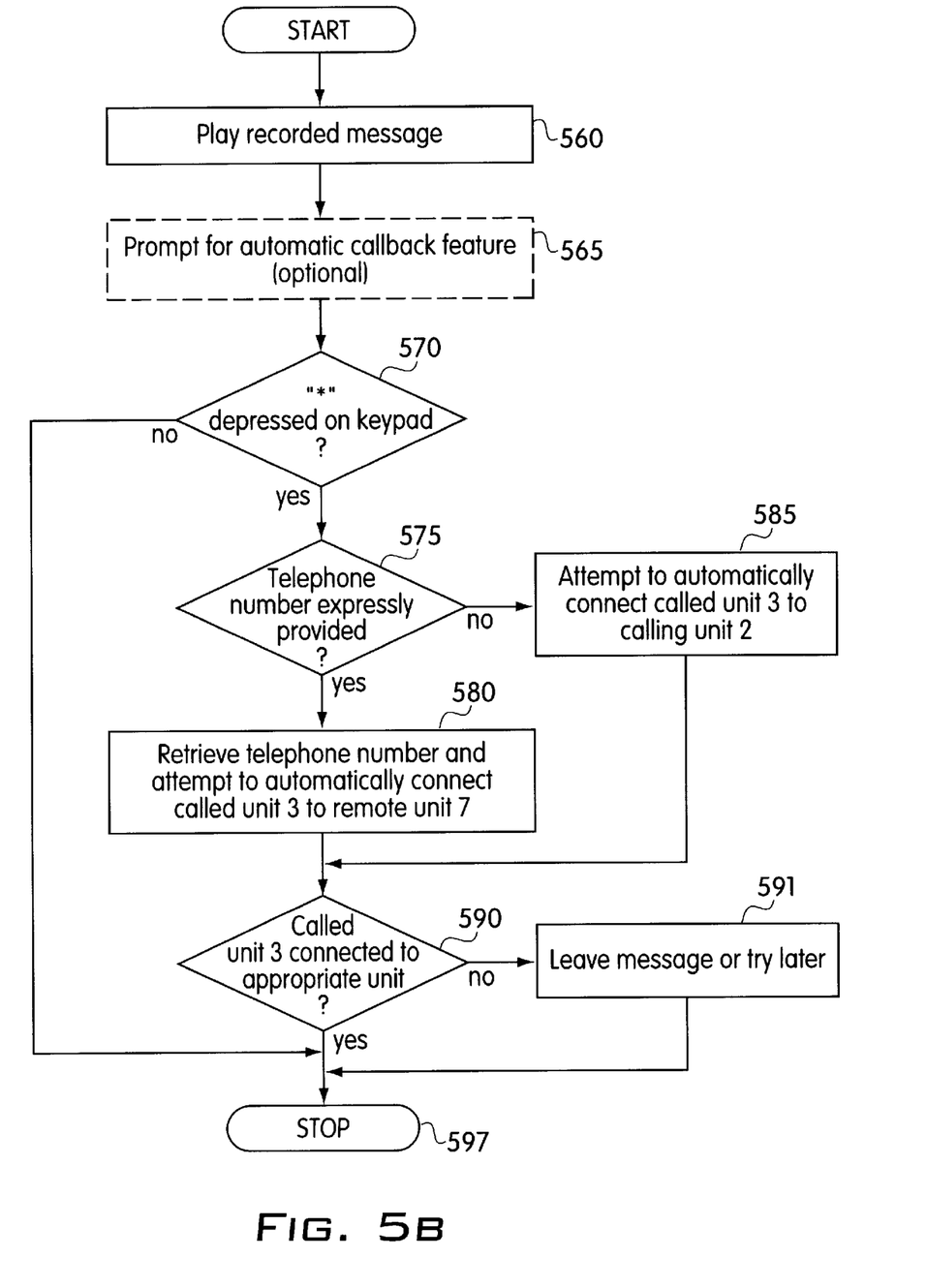
FIG. 5b illustrates a process performed in an exemplary embodiment of the present invention including a feature wherein a call may be automatically returned to remote unit.

The flowchart of FIG. 5*b* illustrates an exemplary process performed when a message recipient requests message playback, and the system supports both an automatic callback feature, and allows the calling party (i.e., the party who recorded the message) to provide a return telephone number different than the telephone number associated with the calling unit 2.

As described in connection with FIG. 3*b*, to retrieve messages, the message recipient accesses the message delivery system 1. For example, the message recipient may dial a telephone number associated with the message delivery system 1, and may be connected to the message delivery system 1 via communications arrangement 5. Upon answering the call, the message delivery system 1 may prompt the message recipient for a mailbox number, a password, etc. The message recipient may then be prompted with a series of menu options, including, for example, an option to playback messages.

Once the message recipient selects the message playback option, the process illustrated in the flowchart of FIG. 5*b* is performed by processor 10, for example. In accordance with the exemplary embodiment, the processor 10 may play the recorded message to the message recipient (step 560). After the message is played, the message recipient is optionally prompted to depress a predetermined sequence of touch-tone keys (e.g., "*") on the touch-tone keypad of the called unit 3 if the message recipient desires to automatically return the call (step 565). If the caller does not depress the predetermined sequence within a preset time interval (step 570), the process terminates (step 597).

In the alternative embodiment, the processor 10 may provide the calling number of the calling unit 2 which originated the message, and then inquire if the recipient prefers to play the message originated by the calling unit 2 or activate the callback feature (without listening to the message).

If the message recipient depresses the predetermined key sequence (whether in response to a prompt or not) (step 570), the message delivery system 1 (in particular, processor 10) determines whether a return telephone number was expressly provided by the party who recorded the message (step 575).

If a telephone number was expressly provided (and, therefore, was stored in association with the message), the message delivery system 1 retrieves the telephone number from storage device 14, and attempts to connect the message recipient to the remote unit 7 (i.e., the telephone unit corresponding to the telephone number provided)(step 580) via communications arrangement 8.

If a telephone number was not expressly provided (step 575), the message delivery system 1 attempts to connect the message recipient to the calling unit 2 (step 585) via communications network 4.

If the message delivery system 1 was unsuccessful in connecting the called unit 3 to the appropriate telephone unit (remote unit 7 or calling unit 2) (step 590), the message recipient at the called unit 3 may be prompted to leave a message (as in, for example, the process of FIG. 4*a*), or may be asked to try again later (step 591). The process of FIG. 5*b* then terminates (step 597).

Other Embodiments

While the present invention has been particularly shown and described with reference to exemplary embodiments thereof, it will be understood by those skilled in the art that various changes in form and details may be made therein without departing from the spirit and scope of the invention. For example, a system may include both the reverse billing feature and the return telephone number feature. Additionally, the return telephone number feature may include a feature whereby if the called unit 3 fails to establish a connection with the remote unit 7, the message delivery system 1 may attempt to connect the called unit 3 with the calling unit 2. Additionally, the system may include a feature whereby the return telephone number expressly provided by the party recording a message is billed for the call when the called party 3 returns the call.

What is claimed is:

1. A telephone system for providing a callback feature to a called unit, comprising:
    a communications device receiving a first telephone call from a calling unit directed to the called unit, the communications device further receiving caller information and a message from the calling unit, the caller information being provided by a telecommunication system without prompting the calling unit for the caller information; and
    a processor recording the caller information and the message into a storage device, the processor providing the message to the called unit,
    wherein, after the processor records the message, the processor determines if the callback feature is activated, and
    wherein, when the processor determines that the callback feature is activated, the processor routes a second telephone call from the called unit to the calling unit using the caller information.

2. The telephone system according to claim 1, wherein the communication device receives called party information, the processor recording the called party information in the storage device.

3. The telephone system according to claim 1,
    wherein the processor provides the caller information to a billing system to bill the calling unit for the second telephone call.

4. The telephone system according to claim 1, wherein, if the second telephone call is not answered by the calling unit, the processor prompts a called party of the called unit to provide a return message for a calling party at the calling unit during the second call, the return message having the calling information, the return message being recorded in the storage device.

5. The telephone system according to claim 3,
    wherein the processor provides the caller information to a billing system to bill the calling unit for the second telephone call.

6. The telephone system according to claim 1, wherein the caller data correspond to ANI signals.

7. The telephone system according to claim 4, wherein the processor generates a continuous message signal to the calling unit when the return message corresponding to the caller information is stored in the storage device.

8. The telephone system according to claim 1, wherein the callback feature corresponds to a predetermined data stream associated with a predetermined key sequence depressed at the called unit.

9. A telephone system for providing a callback feature to a called unit, comprising:
    a communications device receiving a first telephone call from a calling unit directed to the called unit, the communication device further receiving return information and a message from a calling unit; and
    a processor recording the return information and the message into a storage device, the processor providing the message to the called unit, wherein, after the processor records the message and without prompting the calling unit to activate the callback feature, the processor determines if the callback feature is activated, and wherein, when the processor determines that the callback feature is activated, the processor routes a second telephone call from the called unit to a remote unit as a function of the return information.

10. The telephone system according to claim 9, wherein the return information corresponds to a telephone number of the remote unit.

11. The telephone system according to claim 9, wherein the communication device receives caller information.

12. The telephone system according to claim 11, wherein the caller information correspond to ANI signals.

13. The telephone system according to claim 9, wherein the processor provides the return information to a billing system to bill the calling unit for the second telephone call.

14. The telephone system according to claim 11, wherein, if the second telephone call is not answered by the remote unit, the processor routes the second telephone call from the called unit to the calling unit using the caller information, and wherein, if the second telephone call is not answered by the calling unit, the processor prompts a called party of the called unit to provide a return message for a calling party at the calling unit during the second call, the return message having the calling information, the return message being recorded in the storage device.

15. The telephone system according to claim 14, wherein the processor provides the return information to a billing system to bill the calling unit for at least one of the return telephone call and the return message.

16. The telephone system according to claim 9, wherein the callback feature corresponds to a predetermined data stream associated with a predetermined key sequence depressed at the called unit.

17. A method for providing a callback feature to a called unit, comprising the steps of:

receiving caller information, called party information and a message from a calling unit, the caller information being provided by a telecommunication system without prompting the calling unit for the caller information;

recording the caller information, the called party information and the message into a storage device;

connecting the called unit to a telephone system, the called unit corresponding to the called party information;

providing the message to the called unit;

after the called unit receives the message from the calling unit, determining if the callback feature is activated; and if the callback feature is activated, routing a return telephone call from the called unit to the calling unit using the caller information.

18. The method according to claim 17, further comprising the step of:

providing the caller information to a billing system to bill the calling unit for the return telephone call.

19. The method according to claim 17, further comprising the step of:

if the returned telephone call is not answered by the calling unit, prompting a called party of the called unit to provide a return message for a calling party at the calling unit having the calling information.

20. The method according to claim 19, further comprising the step of:

if the return message is provided by the called party from the called unit, recording the return message in the storage device.

21. The method according to claim 19, further comprising the step of:

generating a continuous message signal to the calling unit when the return message corresponding to the caller information is stored in the storage device.

22. The method according to claim 17, wherein the callback feature corresponds to a predetermined data stream associated with a predetermined key sequence depressed at the called unit.

23. A method for providing a callback feature to a called unit, comprising the steps of:

receiving caller information, return information, called party information and a telephone message from a calling unit;

recording the caller information, the return information, the called party information and the message into a storage device;

connecting the called unit to a telephone system, the called unit corresponding to the called party information;

providing the message to the called unit;

after the called unit receives the message from the calling unit and without prompting the calling unit to activate the callback feature, determining if the callback feature is activated; and if the callback feature is activated, routing a return telephone call from the called unit to a remote unit using the return information.

24. The method according to claim 23, wherein the return information corresponds to a further telephone number of the remote unit.

25. The method according to claim 24, further comprising the step of:

providing the caller information to a billing system to bill the calling unit for the return telephone call.

26. The method according to claim 24, further comprising the steps of:

if the return telephone call is not answered by the remote unit, routing the return telephone call from the called unit to the calling unit using the caller information; and if the return telephone call is not answered by the calling unit, prompting a called party of the called unit to provide a return message for a calling party at the calling unit having the calling information, the return message being recorded in the storage device.

27. The method according to claim 26, further comprising the step of:

providing the caller information to a billing system to bill the calling unit for at least one of the return telephone call and the return message.

28. The method according to claim 23, wherein the callback feature corresponds to a predetermined data stream associated with a predetermined key sequence depressed at the called unit.

* * * * *